(12) United States Patent
Sato (10) Patent No.: US 7,593,001 B2
(45) Date of Patent: Sep. 22, 2009

(54) IMAGE-PROCESSING APPARATUS

(75) Inventor: Tadamitsu Sato, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 549 days.

(21) Appl. No.: 11/136,579

(22) Filed: May 23, 2005

(65) Prior Publication Data

US 2005/0259072 A1 Nov. 24, 2005

(30) Foreign Application Priority Data

May 24, 2004 (JP) .............................. 2004-152642

(51) Int. Cl.
*G09G 5/00* (2006.01)
(52) U.S. Cl. ...................... 345/168; 345/173
(58) Field of Classification Search ................. 345/156, 345/168, 169, 173
See application file for complete search history.

(56) References Cited

U.S. PATENT DOCUMENTS

| | | | |
|---|---|---|---|
| 5,729,219 A * | 3/1998 | Armstrong et al. ............ 341/20 |
| 5,909,207 A * | 6/1999 | Ho .............................. 345/156 |
| 6,704,005 B2 | 3/2004 | Kato et al. |
| 6,784,384 B2 * | 8/2004 | Park et al. .................. 200/11 R |
| 7,444,163 B2 * | 10/2008 | Ban et al. ................. 455/550.1 |
| 2002/0030665 A1 * | 3/2002 | Ano ........................... 345/168 |
| 2002/0033848 A1 * | 3/2002 | Sciammarella et al. ...... 345/838 |
| 2003/0043121 A1 * | 3/2003 | Chen .......................... 345/169 |
| 2003/0095096 A1 * | 5/2003 | Robbin et al. ............... 345/156 |

FOREIGN PATENT DOCUMENTS

WO WO 2004031930 A1 * 4/2004

* cited by examiner

*Primary Examiner*—Amr Awad
*Assistant Examiner*—Stephen G Sherman
(74) *Attorney, Agent, or Firm*—Brinks Hofer Gilson & Lione (57) ABSTRACT

An image-processing apparatus includes an input unit for inputting operational signals. The input unit includes an operation surface and outputs, as the operational signals, a position detection signal representing a detected operation position of an operation instrument moving on the operation surface and a selection confirmation signal generated when a selection operation is confirmed on the operation position. The image-processing apparatus further includes a display unit and a display-controlling unit for controlling the display state of the display unit based on the operational signals. The display-controlling unit highlights an index corresponding to the operation position when the position detection signal is output in a state in which indices to be selected are displayed on the display unit, and reads and displays main data corresponding to the highlighted index when the selection confirmation signal is output.

7 Claims, 6 Drawing Sheets

IMAGE-PROCESSING APPARATUS

This application claims the benefit of priority to Japanese Patent Application No. 2004-153454 filed on May 24, 2004, herein incorporated by reference.

BACKGROUND OF THE INVENTION

1. Field of the Invention

The present invention relates to image-processing apparatuses including display units for displaying various types of information, and more particularly to an image-processing apparatus for easily searching for various types of information to display the information.

2. Description of the Related Art

Currently, display units for displaying image information have multiple functions, and, for example, digital television receivers can handle several tens to several hundred channels that are selected by viewers. Other than digital television receivers, various types of terminal units installed in, for example, banks or retail stores also handle many information channels that are selected by users. Mobile data terminals also handle many information channels.

An input device for operating the television receiver and various types of terminal units may be a remote controller that is connected to these units either wirelessly or via a cable, or it may be integrated with these units.

Unfortunately, since known input devices are mainly numeric keypads or keyboards, operation units cannot handle the high volume of information to be displayed on display units. Thus, for example, a user needs to press buttons provided on a remote controller many times to display necessary information, and the operation thus becomes cumbersome.

An input device disclosed in Japanese Unexamined Patent Application Publication No. 2002-123363 includes a tablet-type coordinate detection unit and a numeric keypad. This input device allows a user to input many types of information through a position detection signal from the coordinate detection unit or an input signal from the numeric keypad. However, even when this input device is used in combination with a display unit for displaying a high volume of information, the user needs to sequentially display multiple screens by performing a predetermined operation. Thus, when the user selects any information from the high volume of information, the operation is cumbersome.

SUMMARY OF THE INVENTION

To solve the problems described above, the present invention provides an image-processing apparatus including a display unit for displaying a high volume of information. In this image-processing apparatus, operation positions on an operation surface correspond to the display state of a screen so that a user can easily and intuitively select information and a high volume of information can be read without a cumbersome operation.

An image-processing apparatus according to the present invention includes an input unit for inputting operational signals. The input unit includes an operation surface and outputs, as the operational signals, a position detection signal representing a detected operation position of an operation instrument moving on the operation surface and a selection confirmation signal generated when a selection operation is confirmed on the operation position. The image-processing apparatus further includes a display unit and a display-controlling unit for controlling the display state of the display unit based on the operational signals. The display-controlling unit highlights an index corresponding to the operation position on the operation surface when the position detection signal is output from the input unit in a state in which a plurality of indices to be selected are displayed on the display unit, and reads and displays main data corresponding to the highlighted index when the selection confirmation signal is output from the input unit.

In the image-processing apparatus according to the present invention, a plurality of indices displayed on a screen can be highlighted by moving the operation instrument, for example, a finger, on the operation surface of the input unit. Thus, even when the number of indices displayed on the screen is large, the indices can be selected. When the selection of any of the indices is confirmed in a state in which this index is selected, data corresponding to the index can be quickly read out.

An index selected from the plurality of indices may be different from other indices displayed on the display unit in the way these indices are displayed.

A plurality of selection positions for confirming a selection operation may be displayed on the operation surface in an array pattern that is the same as an array pattern of the plurality of indices. The plurality of selection positions correspond to the plurality of indices.

In this arrangement, even when a user does not watch the operation surface, the user can highlight an index by moving, for example, a finger on the operation surface and can confirm the selection operation on the operation position using the finger to read out the main data quickly.

The input unit may further include a coordinate detection unit for outputting the position detection signal and a switching unit for outputting the selection confirmation signal. The switching unit is disposed in a detectable area of the coordinate detection unit.

Alternatively, the input unit may further include a coordinate detection unit for outputting the position detection signal and the selection confirmation signal.

The input unit may output a switching signal for changing a group of indices to be displayed on the display unit, and the display-controlling unit may display another group of indices on the display unit instead of a group of indices that is currently displayed when the switching signal is output.

Individual groups of indices can be displayed on the display unit in turn by outputting the switching signal.

The input unit may output a switching signal for changing an index to be displayed on the display unit, and the display-controlling unit may display another index on the display unit instead of an index that is currently displayed when the switching signal is output.

In this case, some indices that are currently displayed on the display unit can be changed to other indices by outputting the switching signal to scroll a screen of the display unit.

The image-processing apparatus may further include a separate switching unit for outputting the switching signal. The switching signal may be generated based on at least one of the position detection signal and the selection confirmation signal.

The main data may be image data having a predetermined running time from, for example, channels of digital television broadcasting, and the indices may show titles of the image data.

The main data may image data, for example, a digital photograph, that is displayed on the display unit by a single operation, and the indices may show a reduced display or degraded display of the image data.

The main data may be operational information or configuration information of the image-processing apparatus, and the indices may show titles of the operational information or the configuration information.

In the present invention, a high volume of data can be easily selected, and the selected main data can be quickly read out.

DESCRIPTION OF THE PREFERRED EMBODIMENTS

Figure 1:
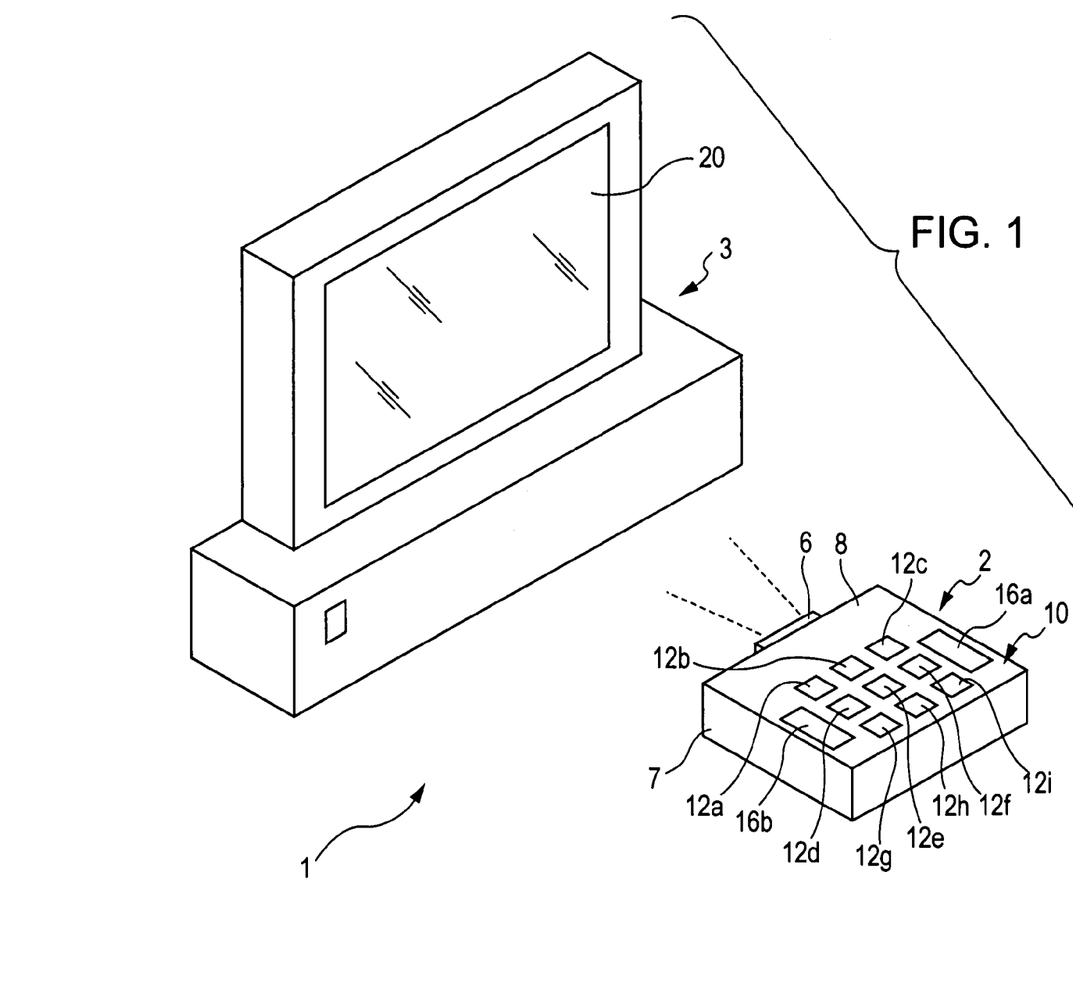
FIG. 1 is a perspective view illustrating the overall structure of an image-processing apparatus according to a first embodiment of the present invention.
Figure 2:
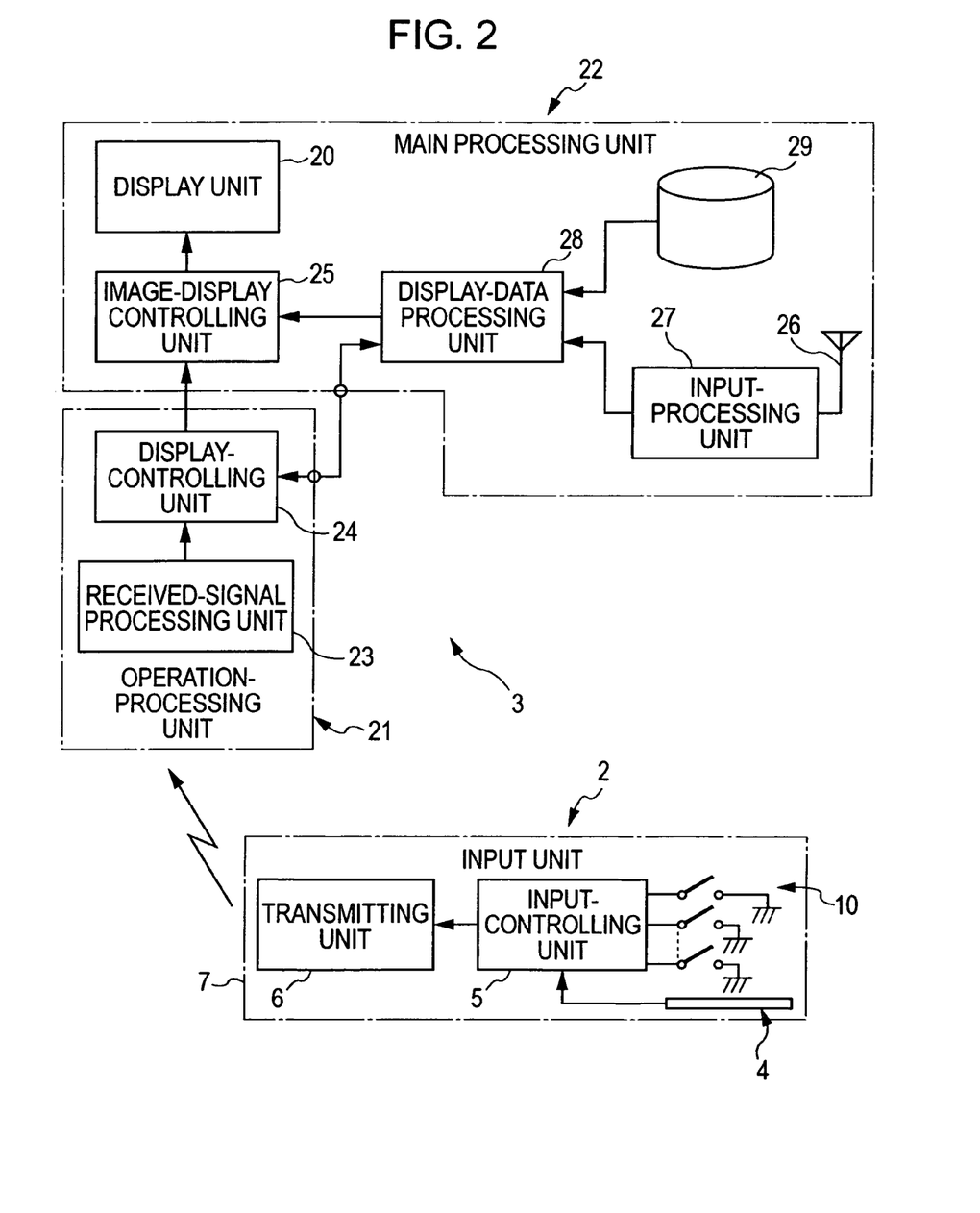
FIG. 2 is a block diagram illustrating the structure of the image-processing apparatus.
Figure 3:
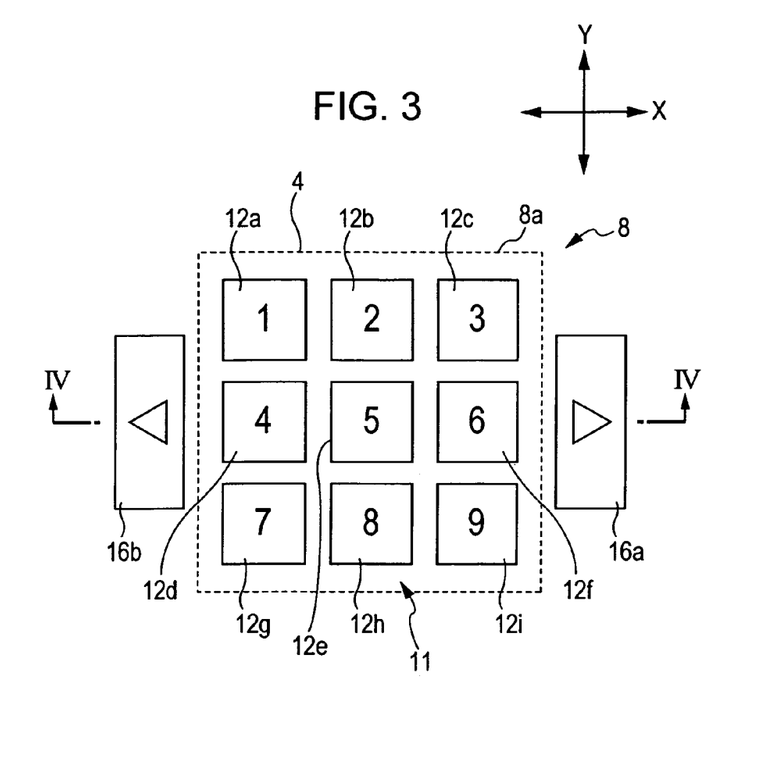
FIG. 3 is an enlarged plan view illustrating an operation surface of an input unit.
Figure 4:
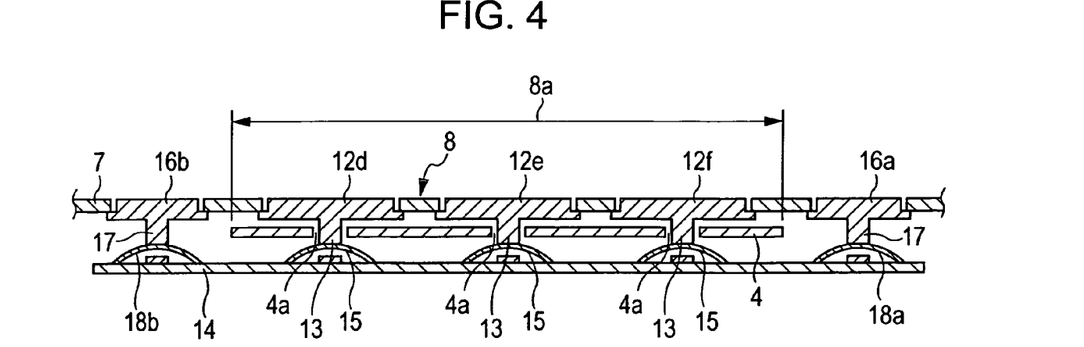
FIG. 4 is a sectional view taken along line IV-IV in FIG. 3.
Figure 5:
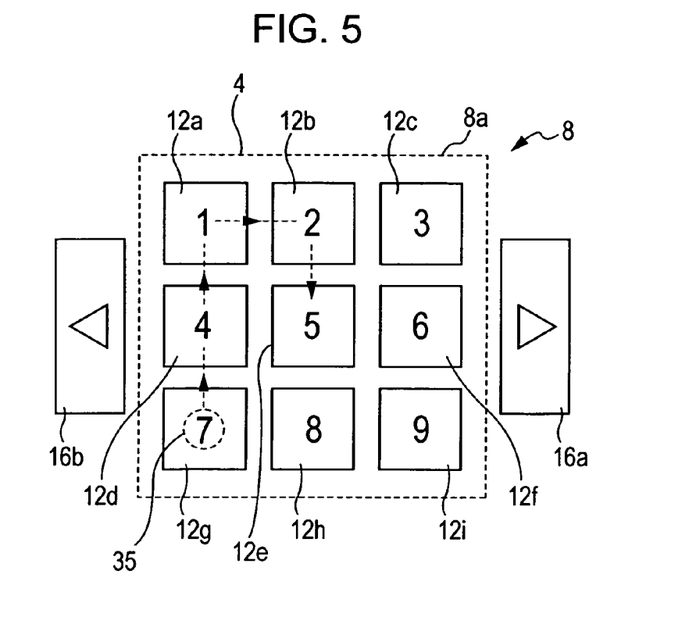
FIG. 5 is a plan view illustrating a typical operation on the operation surface.
Figure 6:
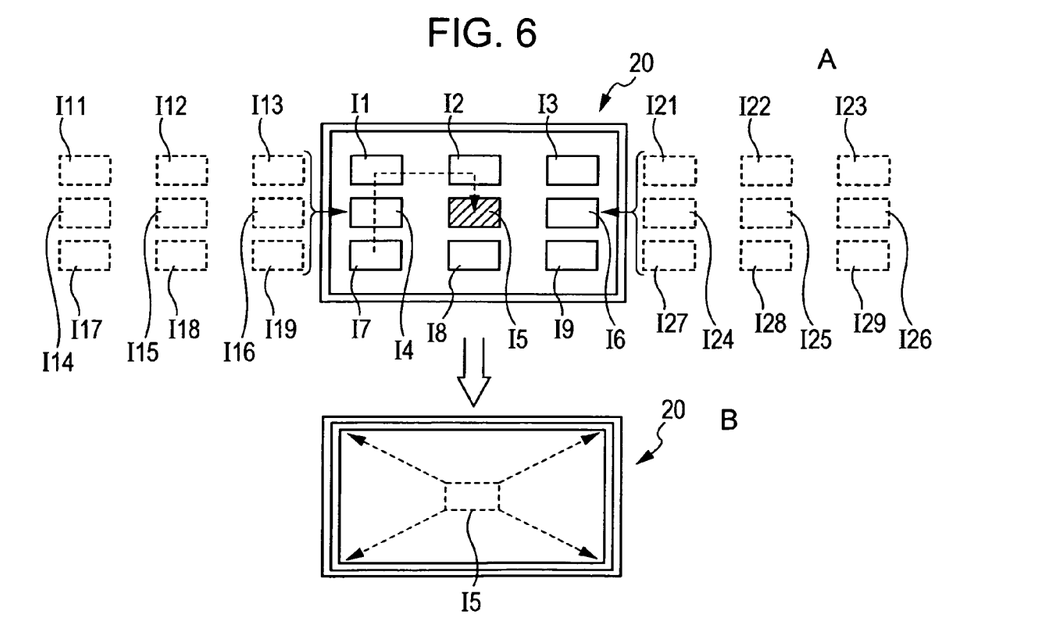
FIG. 6 is a schematic view illustrating a typical displaying operation.
Figure 7:
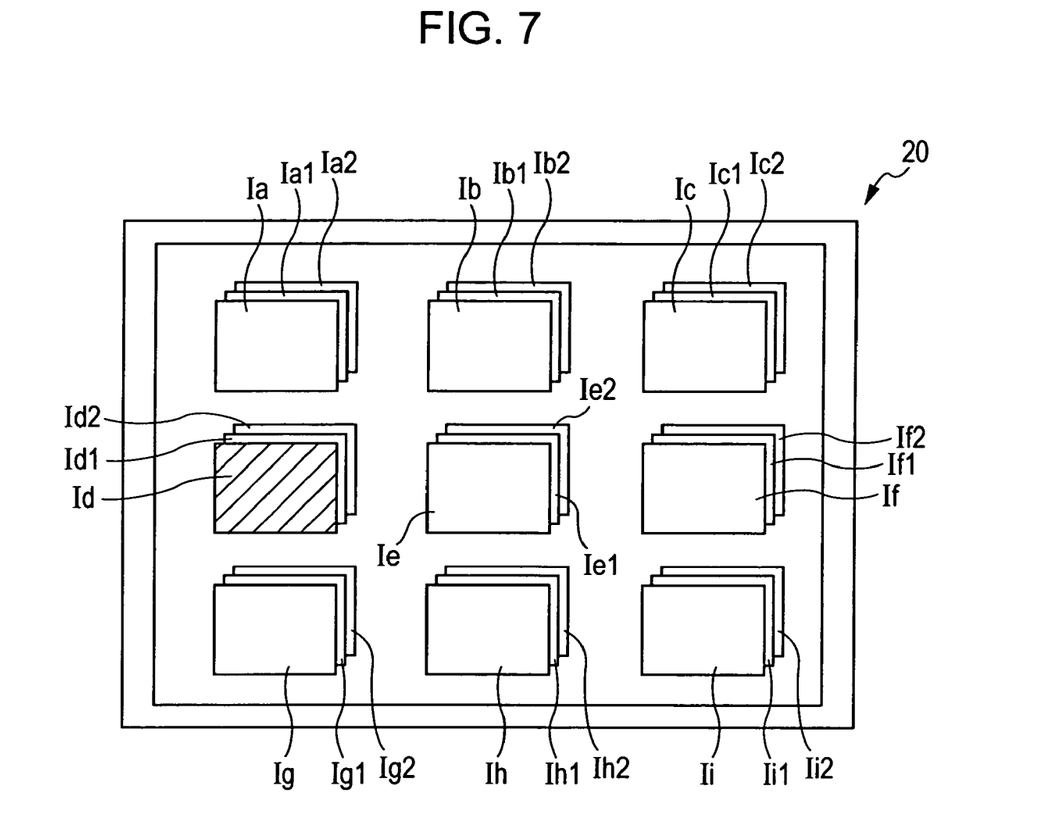
FIG. 7 is a schematic view illustrating a typical screen of a display unit according to a second embodiment of the present invention.
Figure 8:
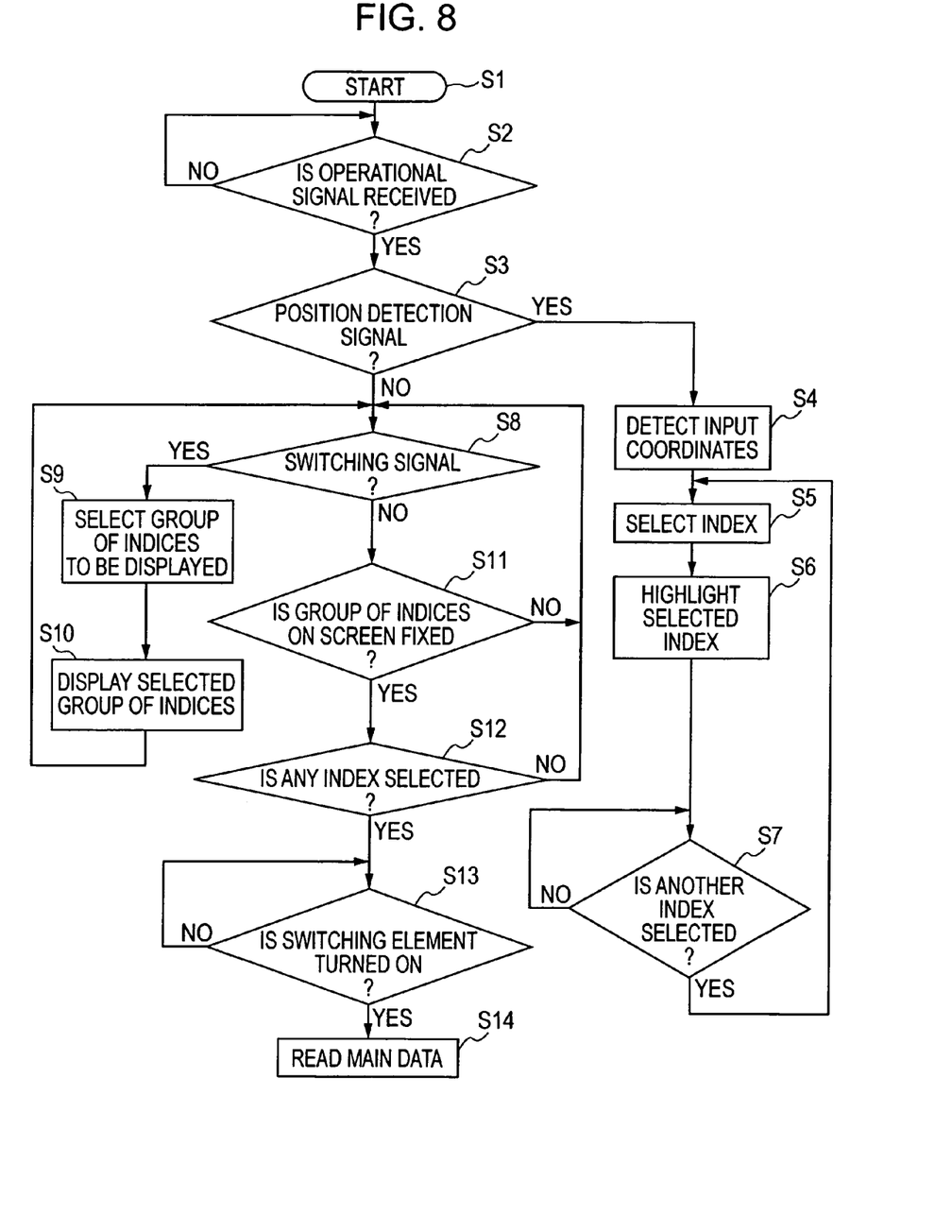
FIG. 8 is a flowchart illustrating the operation of the image-processing apparatus according to the first embodiment.

FIG. 1 is a perspective view illustrating the overall structure of an image-processing apparatus according to a first embodiment of the present invention. FIG. 2 is a block diagram illustrating the structure of the image-processing apparatus. FIG. 3 is an enlarged plan view illustrating an operation surface of an input unit. FIG. 4 is a sectional view taken along line IV-IV in FIG. 3, illustrating the internal structure of the input unit. FIG. 5 is a plan view illustrating a typical operation on the operation surface. FIG. 6 is a schematic view illustrating a displaying operation in a display unit corresponding to the operation shown in FIG. 5. FIG. 7 is a schematic view illustrating a typical screen of a display unit according to a second embodiment of the present invention. FIG. 8 is a flowchart illustrating the operation of the image-processing apparatus according to the first embodiment.

The image-processing apparatus 1 shown in FIG. 1 includes the input unit 2, which is a wireless remote controller, and a display main unit 3 controlled by the input unit 2. In the present invention, the input unit 2 may be integrated with the display main unit 3.

As shown in FIG. 2, the input unit 2 includes a coordinate detection unit 4 for inputting a position, a switching unit 10 for confirming a selection, an input-controlling unit 5, a transmitting unit 6, and a casing 7. The input-controlling unit 5 generates a position detection signal corresponding to an input from the coordinate detection unit 4, and a selection confirmation signal and a switching signal corresponding to inputs from the switching unit 10. The transmitting unit 6 may be an infrared transmitter or a radio frequency (RF) transmitter and transmits the position detection signal, the selection confirmation signal, and the switching signal to the display main unit 3. The upper surface of the casing 7 is a flat operation surface 8. The operation surface 8 may be a curved surface, for example, a spherical surface.

The operation surface 8, shown magnified in FIG. 3, includes a position-inputting region 8a having a predetermined area. In order to distinguish the position-inputting region 8a from other regions in the operation surface 8, the color of the position-inputting region 8a may be different from the colors of the other regions, or the position-inputting region 8a may be slightly more indented or protruding than the other regions.

As shown in FIG. 4, the coordinate detection unit 4, having a size corresponding to the size of the position-inputting region 8a, is disposed at a location close to the inner side of the operation surface 8. The coordinate detection unit 4 is of the capacitive type.

The capacitive coordinate detection unit 4 includes X-coordinate detecting electrodes, first ground electrodes, Y-coordinate detecting electrodes, and second ground electrodes on a dielectric substrate. The X-coordinate detecting electrodes extend in the Y-axis direction and are disposed at a predetermined pitch in the X-axis direction. Each of the first ground electrodes intervenes between two adjacent X-coordinate detecting electrodes. The Y-coordinate detecting electrodes extend in the X-axis direction and are disposed at a predetermined pitch in the Y-axis direction. Each of the second ground electrodes intervenes between two adjacent Y-coordinate detecting electrodes. When an electrical conductor, for example, a finger, comes into contact with the operation surface 8, the X coordinate of the contact position on the operation surface 8 is detected by detecting a change in capacitance between the X-coordinate detecting electrodes and the first ground electrodes. The Y coordinate of the contact position on the operation surface 8 is detected in a similar manner.

As shown in FIG. 3, the position-inputting region 8a according to the first embodiment includes nine buttons 12a, 12b, 12c, 12d, 12e, 12f, 12g, 12h, and 12i for confirming a selection in an XY array pattern. The buttons 12a to 12i are arranged so that the levels of these buttons are substantially the same as that of the operation surface 8, as viewed from the side. Each of the buttons 12a to 12i also displays a selection position for confirming a selection. In FIGS. 3 and 5, identifications are assigned to these buttons, i.e., "1", "2", . . . "9". Alternatively, identifications other than numeric characters may be assigned to the buttons, or no identification may be assigned to the buttons.

As shown in FIG. 4, a protrusion 13 is formed at the center of the back surface of each of the buttons 12a to 12i to extend to the interior of the casing 7. The protrusions 13 extend through holes 4a formed in the coordinate detection unit 4 so as to extend past the back surface of the coordinate detection unit 4.

A wiring board 14 is provided parallel to and opposing the back surface of the coordinate detection unit 4. Switching elements 15 each including an inverting spring contact are provided in an array pattern on the wiring board 14. The protrusions 13 oppose the inverting spring contacts of the respective switching elements 15.

When a finger, serving as an operation instrument, comes into contact with the position-inputting region 8a, coordinates of the contact position are output from the coordinate detection unit 4. As this finger slides on the position-inputting region 8a, coordinates of the moving contact position are continuously output from the coordinate detection unit 4. As shown in FIG. 4, the cross-sectional area of each protrusion 13 is small, and the back surface of each of the buttons 12a to 12i opposes the coordinate detection unit 4. Thus, even when the finger comes into contact with the front surface of each of the buttons 12a to 12i, the coordinates of the contact position can be obtained.

When any of the buttons 12a to 12i is pushed, the inverting spring contact is pushed by the protrusion 13 integrated with the pushed button and is inverted. Then, the switch output of a switching element 15 corresponding to the pushed button is switched on.

As shown in FIG. 3, the operation surface 8 includes buttons 16*a* and 16*b* for switching operation at the right and left sides of the position-inputting region 8*a*. As shown in FIG. 4, switching elements 18*a* and 18*b* are provided on the wiring board 14, and a protrusion 17 is formed on the back surface of each of the buttons 16*a* and 16*b* to push an inverting spring contact of each of the switching elements 18*a* and 18*b*. In this case, the coordinate detection unit 4 does not oppose the back surface of each of the buttons 16*a* and 16*b*.

The display main unit 3 is divided into blocks for performing various types of control. In FIG. 2, the display main unit 3 is divided into an operation-processing unit 21 and a main processing unit 22.

The operation-processing unit 21 processes a control signal transmitted from the input unit 2. The operation-processing unit 21 may be built into the main processing unit 22, or some functions of the operation-processing unit 21 may be implemented as a program that is associated with the input unit 2 and that is installed and executed in a main controlling unit in the display main unit 3.

The operation-processing unit 21 includes a received-signal processing unit 23 and a display-controlling unit 24. The received-signal processing unit 23 receives and processes a control signal transmitted from the transmitting unit 6 in the input unit 2 in the form of an infrared signal or an RF signal. The display-controlling unit 24 analyzes the control signal processed in the received-signal processing unit 23 to control image display in the main processing unit 22.

The main processing unit 22 includes a display unit 20, an image-display controlling unit 25, an antenna 26, an input-processing unit 27, a display-data processing unit 28, and a mass storage unit 29. The display unit 20 is, for example, a liquid crystal display, a plasma display, or a CRT display. The mass storage unit 29 is, for example, a hard disk drive. The image-display controlling unit 25 generates image signals to be output to the display unit 20. When the image-processing apparatus 1 is a digital television receiver, the input-processing unit 27 including a decoder as a main part demodulates signals input from the antenna 26 or signals input from a cable. Then, the display-data processing unit 28 processes these input signals to be output to the image-display controlling unit 25 as image data to be displayed.

When image data to be displayed is stored in the mass storage unit 29, the display-data processing unit 28 processes the image data read from the mass storage unit 29 to be output to the image-display controlling unit 25.

An input operation and an image display operation in the image-processing apparatus 1 will now be described.

In the image-processing apparatus 1, as shown in Part A of FIG. 6, indices I1, I2, I3, I4, I5, I6, I7, I8, and I9 are displayed on the screen of the display unit 20 in an array pattern. For example, when main data is digital television images that are supplied from multiple channels, each index shows a title of a program currently being broadcasted on a channel, the description of the program, a still image of a main scene, or a preview movie (a digest movie).

The number of channels that supply digital television images may be several tens to several hundred, and a group of indices corresponding to some of the channels is displayed on the screen of the display unit 20. The number of indices in a group to be displayed on the screen is the same as the number of the buttons 12*a* to 12*i*, and these indices are displayed in an array pattern corresponding to the array pattern of the buttons 12*a* to 12*i*. In the first embodiment, the nine buttons 12*a* to 12*i* are disposed on the position-inputting region 8*a* in three lines in the X-axis and Y-axis directions, and the nine indices I1 to I9 are displayed on the screen of the display unit 20 in three lines in the vertical and horizontal directions.

In a state in which the group of indices I1 to I9 is displayed on the display unit 20, when the button 16*a* at the right side of the position-inputting region 8*a* is pushed and the switching element 18*a* detects this operation, a switching signal is transmitted from the transmitting unit 6 to the received-signal processing unit 23.

Then, the display-controlling unit 24 transmits the switching signal to the image-display controlling unit 25 and the display-data processing unit 28. Upon receiving the switching signal, the image-display controlling unit 25 and the display-data processing unit 28 control the screen of the display unit 20 so that the group of indices I1 to I9 moves on the screen towards the right and disappears from the screen. At the same time, another group of indices I11, I12, I13, I14, I15, I16, I17, I18, and I19 appears from the left side of the screen in an array pattern.

Conversely, when the button 16*b* at the left side of the position-inputting region 8*a* is pushed and the switching element 18*b* detects this operation, the group of indices I1 to I9 moves on the screen towards the left and disappears from the screen, and another group of indices I21, I22, I23, I24, I25, I26, I27, I28, and I29 appears from the right side of the screen in an array pattern.

In this way, a group of indices displayed on the display unit 20 is changed by pushing the button 16*a* or 16*b*. In addition to the buttons 16*a* and 16*b*, a pair of buttons may be provided on the upper and lower sides of the position-inputting region 8*a*, and a group of indices displayed may be changed using this pair of buttons and the buttons 16*a* and 16*b*.

When a program is scheduled to be recorded, the airdate and airtime of the program may be selected by pushing the pair of buttons described above, and a group of indices for the program may be displayed by pushing the buttons 16*a* and 16*b*.

When image data is read from the mass storage unit 29 to be displayed on the display unit 20, this image data may be moving image data having a predetermined running time or still image data captured by, for example, a digital camera. When the image data is still image data, indices displayed on the display unit 20 each may show a reduced still image, a degraded still image, a title of a still image, or only the shooting date and place.

In the image-processing apparatus 1 according to the first embodiment, some of indices that are currently displayed on the screen of the display unit 20 may move in the horizontal direction to disappear from the screen and other indices may appear on the screen in turn every time the button 16*a* or 16*b* is pushed. This operation is what is called a scrolling operation.

In this arrangement, for example, when the main data is still image data, indices corresponding to still images are displayed by the scrolling operation in chronological or reverse chronological order for each shooting date of the still images or each date when the still images are stored in the mass storage unit 29. Alternatively, groups of indices corresponding to the still images may be displayed in turn.

In a state in which the group of indices I1 to I9 is displayed on the display unit 20 in an array pattern, as shown in Part A of FIG. 6, when a finger 35 serving as an operation instrument comes into contact with the position-inputting region 8*a*, as shown in FIG. 5, the coordinate detection unit 4 detects the coordinates of the contact position of the finger 35 and these detected coordinates are transmitted from the transmitting unit 6 to the received-signal processing unit 23 as a position detection signal. Then, the display-controlling unit 24 controls the image-display controlling unit 25 and the display-data processing unit 28 based on this position detection signal to highlight one of the indices I1 to I9 on the display unit 20 in response to the movement of the finger 35 on the position-inputting region 8a.

The word highlight means displaying an index corresponding to the contact position of the finger 35 on the position-inputting region 8a so that this index is different from other indices in the way they are displayed. For example, as shown in Part A of FIG. 6, the display brightness of the selected index I5 is higher than those of other indices that are not selected, or the display color of the index I5 is different from those of the other indices. Alternatively, the display content of the selected index may be different from that of other indices. For example, only the selected index shows the content of a corresponding program, for example, a still image or moving images, and the other indices show titles of corresponding programs.

Moreover, the frame of the selected index may expand to cover the entire screen of the display unit 20. Specifically, when the finger comes into contact with any button, the frame of the index corresponding to this button may expand. When the finger is released from the button, the frame of the index may be returned to the original state.

A typical operation on the position-inputting region 8a described in FIG. 5 is as follows: The finger 35 first comes into contact with the button 12g, then slides upward on the position-inputting region 8a to come into contact with the buttons 12d and 12a sequentially. Then, the finger 35 slides to the right to come into contact with the button 12b, and slides downward to stop at the button 12e. At the same time, in the display unit 20 shown in Part A of FIG. 6, the indices I7, I4, I1, I2, and I5 are sequentially highlighted in response to the movement of the finger 35 on the position-inputting region 8a.

In a state in which the finger 35 slides on the position-inputting region 8a and an index is highlighted, when a button corresponding to this index is pushed, main data corresponding to the index is read out. In FIG. 5 and Part A of FIG. 6, the finger 35 comes into contact with the button 12e and stops there, and the index I5 at the center of the screen of the display unit 20 is highlighted. In this state, when the button 12e is pushed to turn on a corresponding switching element 15 and a switching signal is transmitted to the display-controlling unit 24, the display-data processing unit 28 reads the main data corresponding to the index I5.

For example, a title of a television channel is displayed on the index I5. In this state, when the television channel is selected, image data of a program of this channel is read out. Then, as shown in Part B of FIG. 6, images of this program are displayed on the frame that has expanded to cover the entire screen of the display unit 20.

When the finger 35 is in contact with the position-inputting region 8a, the display-controlling unit 24 can detect which of the buttons 12a to 12i is in contact with the finger 35 based on a position detection signal from the coordinate detection unit 4. Thus, when the button in contact with the finger 35 is pushed to turn on the corresponding switching element 15, the display-controlling unit 24 can detect which index is finally selected based on the position detection signal.

Accordingly, switch outputs of the switching elements 15 corresponding to the buttons 12a to 12i need not be individually identified for these buttons. When any of the switching elements 15 is turned on, only one type of switching signal needs to be transmitted from the input unit 2. Thus, only few types of signals are transmitted from the input unit 2: one type of position detection signal, one type of switching signal from the switching elements 15, and two types of switching signals from the respective switching elements 18a and 18b.

The indices described above may show the content of television programs and other information stored in the mass storage unit 29. The indices displayed on the display unit 20 may include both indices showing titles of television channels and indices showing information stored in the mass storage unit 29.

Alternatively, the indices may show titles of various types of operational information and configuration information of the display main unit 3. Then, when any index is selected, the frame of the selected index may expand to appear as an operation screen or a configuration screen.

FIG. 8 is a flowchart illustrating a control process of the display-controlling unit 24 when a display-switching operation is performed in the first embodiment.

In step S1, in a state in which the group of indices I1 to I9 is displayed on the screen of the display unit 20, as shown in Part A of FIG. 6, an operational signal from the input unit 2 is waited for. In step S2, when it is determined that an operational signal is received from the input unit 2, the process proceeds to step S3. In step S3, it is determined whether the operational signal is a position detection signal from the coordinate detection unit 4. When the operational signal is the position detection signal from the coordinate detection unit 4, the process proceeds to step S4 where input coordinates are detected.

Then, in step S5, it is determined whether the detected coordinates correspond to coordinates of any index displayed on the display unit 20, that is, the contact position of the finger 35 on the operation surface 8 corresponds to the approximate center of any of the buttons 12a to 12i. When the detected coordinates correspond to coordinates of any index, the process proceeds to step S6, where the selected index is highlighted.

Then, in step S7, it is determined whether the finger 35 in contact with the operation surface 8 has moved to reach a position for selecting another index. When the finger has not moved, the currently selected index remains highlighted. When the finger has moved to reach a position for selecting another index, the process goes back to step S5, and steps S5 and S6 are repeated for the newly selected index to highlight this index.

In step S3, when the operational signal received in the received-signal processing unit 23 is not the position detection signal from the coordinate detection unit 4, the process proceeds to step S8. In step S8, it is determined whether the operational signal is a switching signal that is generated when the button 16a or 16b is pushed, i.e., when the switching element 18a or 18b is pushed.

In step S8, when the operational signal is the switching signal generated when the button 16a or 16b is pushed, the process proceeds to step S9. In step S9, it is determined which of the buttons 16a and 16b is pushed. Then, in step S10, when the button 16a is pushed, the group of indices I11 to I19 is displayed instead of the group of indices I1 to I9. When the button 16b is pushed, the group of indices I21 to I29 is displayed instead of the group of indices I1 to I9.

In step S8, when the operational signal is not the switching signal generated when the button 16a or 16b is pushed, the process proceeds to step S11. In step S11, it is determined whether the group of indices displayed on the display unit 20 is fixed, i.e., the group of indices displayed on the display unit 20 is not changing. When the group of indices is fixed, the process proceeds to step S12. In step S12, it is determined whether any index is selected from the fixed group of indices.

When any index is selected, i.e., the finger 35 is in contact with the approximate center of any of the buttons 12a to 12i, the process proceeds to step S13. In step S13, it is determined whether a switching element 15 is turned on. When the switching element 15 is turned on, the process proceeds to step S14 where main data is read out.

FIG. 7 is a schematic view illustrating a typical screen of a display unit 20 according to a second embodiment of the present invention.

In the second embodiment, the number of indices displayed on the display unit 20 is larger than the number of buttons 12a to 12i. Specifically, indices Ia, Ib, Ic, Id, Ie, If, Ig, Ih, and Ii are displayed in an array pattern corresponding to the array pattern of the buttons 12a to 12i. The index Ia overlaps an index Ia1, and the index Ia1 overlaps an index Ia2. The same arrangement is applicable to the indices Ib to Ii.

When a finger 35 in contact with the position-inputting region 8a moves, one of the indices Ia to Ii is highlighted in response to the position of the finger 35. FIG. 7 illustrates a state in which the finger 35 is in contact with the button 12d and the index Id is highlighted. In this state, when the button 12d is pushed and a corresponding switching element 15 is turned on, main data corresponding to the index Id is read out. At this time, a selected status of the index Id can be cancelled by pushing, for example, a button 16a. When the cancellation is performed, the index Id disappears and the index Id1, which was overlapped by the index Id, appears on the same location and is highlighted in turn. In this state, when the button 12d is pushed and the corresponding switching element 15 is turned on, main data corresponding to the index Id1 is read out. The operation described above is also applicable to the indices Ib to Ii.

The present invention is not limited to the embodiments described above and may be embodied in other specific forms. For example, the input unit 2 may include only the capacitive coordinate detection unit 4. When the coordinate detection unit 4 is operated using a finger, the indices displayed on the display unit 20 are sequentially selected and highlighted. In a state in which an index is highlighted, when a tap operation (an operation where the coordinate detection unit 4 is touched momentarily) is performed on the finger position using the finger, the selection of the highlighted index is confirmed and main data corresponding to this index is read out.

Moreover, instead of the buttons 16a and 16b, a position detection signal from the coordinate detection unit 4 or a switching signal from the switching elements 15 may be used to generate a switching signal for changing the group of indices displayed on the display unit 20.

What is claimed is:

1. An image-processing apparatus comprising:
an input unit for inputting operational signals, the input unit comprising an operation surface, wherein the input unit outputs, as the operational signals, a position detection signal representing a detected operation position of an operation instrument moving on the operation surface and a selection confirmation signal generated when a selection operation is confirmed on the operation position;
a display unit; and
a display-controlling unit for controlling a display state of the display unit based on the operational signals, wherein the display-controlling unit highlights an index corresponding to the operation position on the operation surface when the position detection signal is output from the input unit in a state wherein a plurality of indices to be selected are displayed on the display unit, and reads and displays main data corresponding to the highlighted index when the selection confirmation signal is output from the input unit,
wherein the input unit is a wireless controller that outputs wireless signals,
wherein an index selected from the plurality of indices is different from other indices displayed on the display unit in the way the indices are displayed,
wherein the operation surface comprises a position-inputting region having a predetermined area, the position-inputting region comprising a plurality of selection positions for confirming a selection operation, the plurality of selection positions being displayed on the operation surface in an array pattern that is the same as an array pattern of the plurality of indices, the plurality of selection positions corresponding to the plurality of indices, and each index being an element of the array pattern having an array position,
wherein each index is displayed in a state in which one index overlaps another in a direction toward the back of the display when the number of indices is larger than the number of elements in the array pattern, each index overlapping and being overlapped by another index having the same array position,
wherein the input unit further comprises a coordinate detection unit for outputting the position detection signal and a switching unit for outputting the selection confirmation signal, the switching unit being disposed in a detectable area of the coordinate detection unit,
wherein through holes are formed in a coordinate detection unit, and protrusions formed on the back surface of buttons pass through the through holes to extend onto the back surface of the coordinate detection unit,
wherein a wiring board having inverting spring contacts is formed on the back surface of the coordinate detection unit, and each protrusion presses one corresponding inverting spring contact, whereby the inverting spring contact performs an inverting operation,
wherein the input unit outputs a switching signal for changing a group of indices to be displayed on the display unit, and the display-controlling unit displays another group of indices on the display unit instead of a group of indices that is currently displayed when the switching signal is output, each group of indices being positioned relative to the other groups in a fixed order, and the changing of the group of indices to be displayed is performed on a group-by-group basis, and
wherein the operation surface further comprises at least two switching positions for activating the input unit to output the switching signal, each switching operation position being displayed on the operation surface in an area outside of the predetermined area of the position-inputting region.

2. The image-processing apparatus according to claim 1, wherein the input unit further comprises a coordinate detection unit for outputting the position detection signal and the selection confirmation signal.

3. The image-processing apparatus according to claim 1, further comprising a separate switching unit for outputting the switching signal.

4. The image-processing apparatus according to claim 1, the switching signal is generated based on at least one of the position detection signal and the selection confirmation signal.

5. The image-processing apparatus according to claim 1, wherein the main data is image data having a predetermined running time, and the indices show titles of the image data.

6. The image-processing apparatus according to claim 1, wherein the main data is image data that is displayed on the display unit by a single operation, and the indices show a reduced display or degraded display of the image data.

7. The image-processing apparatus according to claim 1, wherein the main data is operational information or configuration information of the image-processing apparatus, and the indices show titles of the operational information or the configuration information.

* * * * *

UNITED STATES PATENT AND TRADEMARK OFFICE
CERTIFICATE OF CORRECTION

PATENT NO.        : 7,593,001 B2                                    Page 1 of 1
APPLICATION NO.   : 11/136579
DATED             : September 22, 2009
INVENTOR(S)       : Tadamitsu Sato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 965 days.

Signed and Sealed this

Twenty-first Day of September, 2010

David J. Kappos
*Director of the United States Patent and Trademark Office*

UNITED STATES PATENT AND TRADEMARK OFFICE
CERTIFICATE OF CORRECTION

PATENT NO.        : 7,593,001 B2                                      Page 1 of 1
APPLICATION NO.   : 11/136579
DATED             : September 22, 2009
INVENTOR(S)       : Tadamitsu Sato

It is certified that error appears in the above-identified patent and that said Letters Patent is hereby corrected as shown below:

On the Title Page

Item (30), line 1, under "Foreign Application Priority Data", replace "2004-152642" with --2004-153454--.

Signed and Sealed this

Ninth Day of November, 2010

David J. Kappos
*Director of the United States Patent and Trademark Office*